United States Patent
Cavalloni et al.

(10) Patent No.: US 10,677,667 B2
(45) Date of Patent: Jun. 9, 2020

(54) COMPONENT TRANSDUCER AND MULTI-COMPONENT TRANSDUCER USING SUCH COMPONENT TRANSDUCER AS WELL AS USE OF SUCH MULTI-COMPONENT TRANSDUCER

(71) Applicant: KISTLER HOLDING AG, Winterthur (CH)

(72) Inventors: Claudio Cavalloni, Regensdorf (CH); Denis Kohler, Neftenbach (CH); Daniel Fuerer, Zurich (CH)

(73) Assignee: KISTLER HOLDING, AG, Winterthur (CH)

( * ) Notice: Subject to any disclaimer, the term of this patent is extended or adjusted under 35 U.S.C. 154(b) by 305 days.

(21) Appl. No.: 15/579,418

(22) PCT Filed: May 27, 2016

(86) PCT No.: PCT/EP2016/062040
§ 371 (c)(1),
(2) Date: Mar. 30, 2018

(87) PCT Pub. No.: WO2016/193158
PCT Pub. Date: Dec. 8, 2016

(65) Prior Publication Data
US 2018/0306655 A1   Oct. 25, 2018

(30) Foreign Application Priority Data
Jun. 5, 2015 (CH) ........................................ 805/15

(51) Int. Cl.
*G01L 1/16* (2006.01)
*G01L 5/167* (2020.01)
(Continued)

(52) U.S. Cl.
CPC ................ *G01L 1/16* (2013.01); *G01L 3/106* (2013.01); *G01L 3/1442* (2013.01); *G01L 5/16* (2013.01); *G01L 5/167* (2013.01)

(58) Field of Classification Search
CPC . G01L 1/16; G01L 5/16; G01L 3/1442; G01L 3/106; G01L 5/167
See application file for complete search history.

(56) References Cited

U.S. PATENT DOCUMENTS 3,566,163 A   2/1971 Fisher et al.
3,640,130 A   2/1972 Spescha et al.
(Continued)

FOREIGN PATENT DOCUMENTS

CH   472668   9/1967
CH   502590   11/1968
(Continued)

OTHER PUBLICATIONS

Japanese Office Action, JP Application No. 2017-563027, dated Oct. 3, 2018, 7 pages.
(Continued)

*Primary Examiner* — Freddie Kirkland, III
(74) *Attorney, Agent, or Firm* — Dority & Manning, P.A.

(57) ABSTRACT

The invention relates to a component transducer (20) for sensing a torque component (Mx, My, Mz); wherein an element (21) made of piezoelectric crystal material comprises element surfaces; wherein a force component (Fx, Fy, Fz) produces electric polarization charges on the element surfaces; and wherein the torque component (Mx, My, Mz) to be sensed consists of at least one pair having force components (+Fx, −Fx; +Fy, −Fy; +Fz, −Fz) wherein said force components (+Fx, −Fx; +Fy, −Fy; +Fz, −Fz) of a pair have the same axis of action and opposite directions of action. The component transducer (20) receives the force (Continued)

components (+Fx, −Fx; +Fy, −Fy; +Fz, −Fz) of a pair separately.

14 Claims, 9 Drawing Sheets

(51) Int. Cl.
*G01L 3/10* (2006.01)
*G01L 3/14* (2006.01)
*G01L 5/16* (2020.01)

(56) References Cited

U.S. PATENT DOCUMENTS

| | | | |
|---|---|---|---|
| 4,802,371 A | 2/1989 | Calderara et al. | |
| 5,402,684 A | 4/1995 | Engeler et al. | |
| 7,174,792 B2 * | 2/2007 | Ealey | G01D 5/25 73/862.041 |
| 8,042,413 B2 * | 10/2011 | Schaffner | B23K 20/10 73/862.68 |
| 8,720,024 B2 * | 5/2014 | Ting | G01L 3/10 252/62.9 PZ |
| 9,347,839 B2 * | 5/2016 | Kohler | G01L 1/16 |
| 2006/0027031 A1 | 2/2006 | Ealey | |
| 2009/0235762 A1 | 9/2009 | Schaffner | |
| 2011/0239785 A1 | 10/2011 | Ting et al. | |
| 2015/0185094 A1 | 7/2015 | Kohler | |

FOREIGN PATENT DOCUMENTS

| | | |
|---|---|---|
| EP | 0594534 | 4/1994 |
| JP | S63134929 | 9/1988 |
| JP | AH06221943 | 8/1994 |
| JP | AH07043226 | 2/1995 |
| JP | 2009540304 | 11/2009 |
| JP | 2013064623 | 4/2013 |
| WO | WO 2007/143870 | 12/2007 |
| WO | WO 2013/188989 | 12/2013 |

OTHER PUBLICATIONS

Translation of Japanese Office Action, JP Application No. 2017-563027, dated Jul. 9, 2019, 12 pages.
International Search Report and English translation, dated Jul. 13, 2017.
G. Gautschi, Piezoelectric Sensories, Springer-Verlag Berlin Heidelberg 2002, all pages.

* cited by examiner

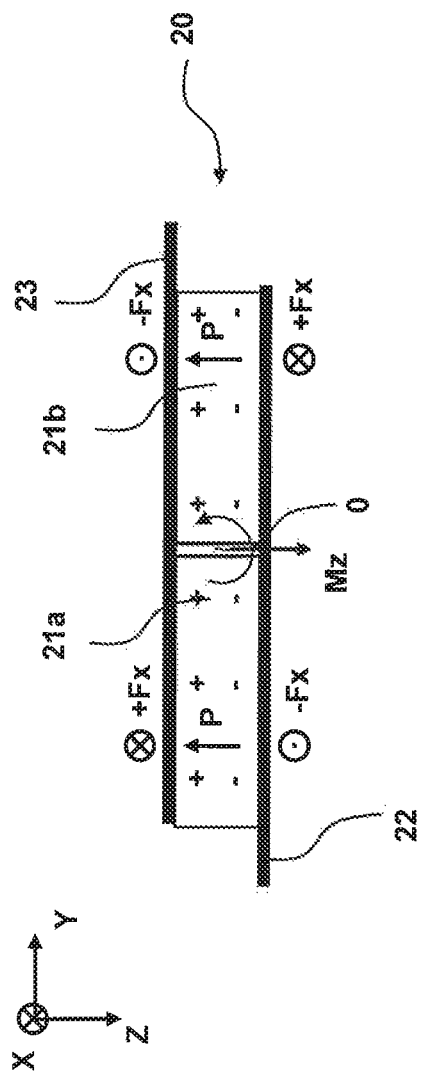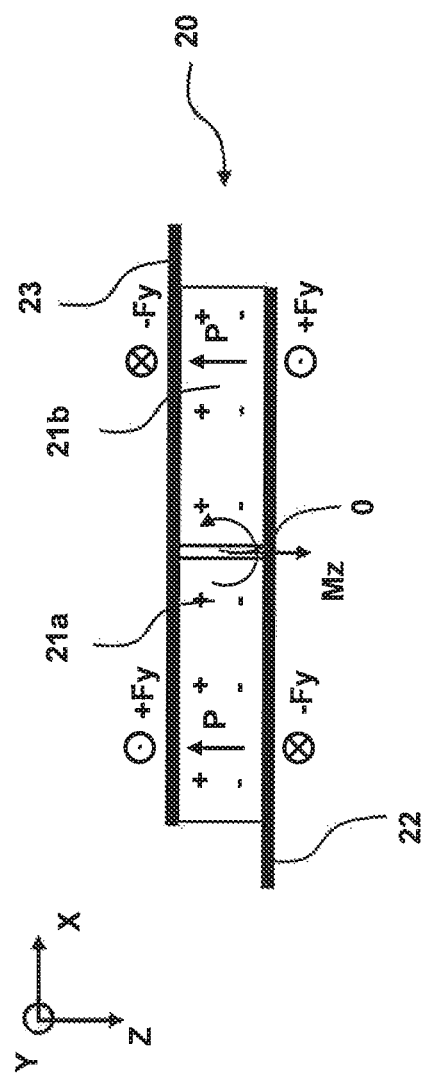

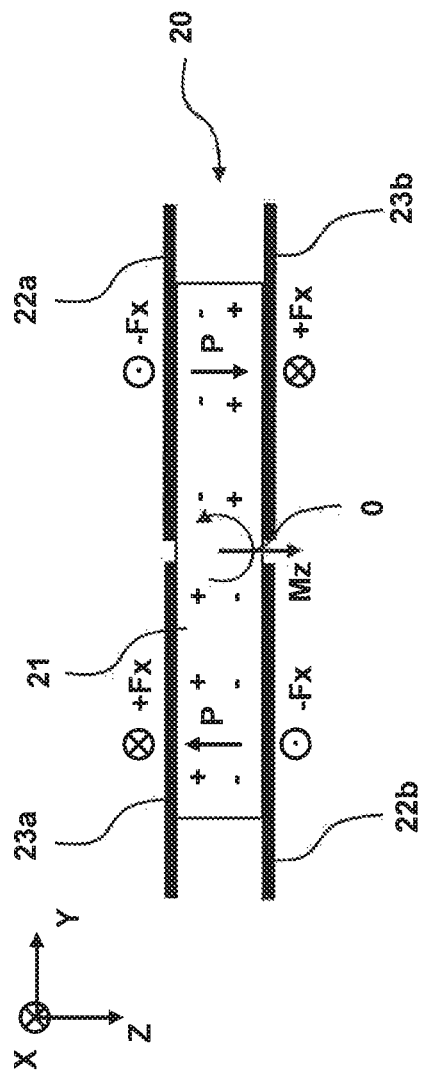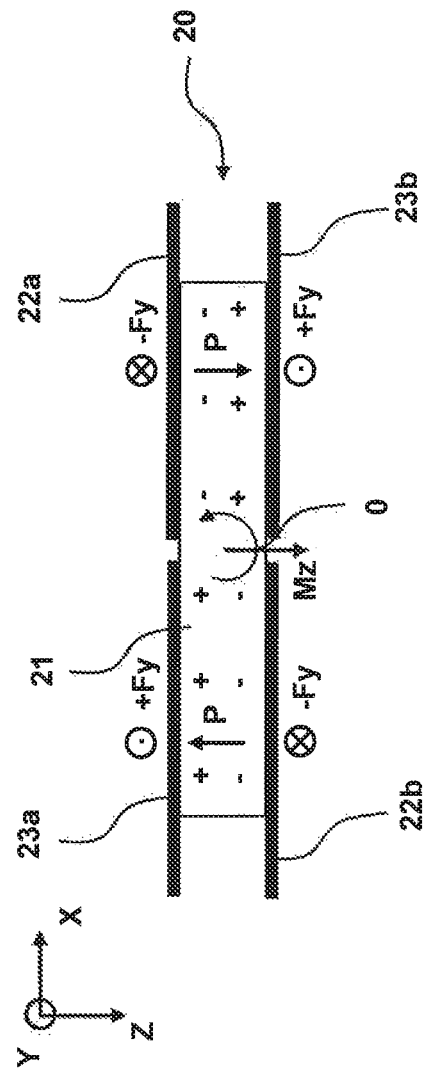

COMPONENT TRANSDUCER AND MULTI-COMPONENT TRANSDUCER USING SUCH COMPONENT TRANSDUCER AS WELL AS USE OF SUCH MULTI-COMPONENT TRANSDUCER

CROSS-REFERENCE TO RELATED APPLICATIONS

This application claims priority to International Application Serial No. PCT/EP2016/062040, filed May 27, 2016, which claims priority to Swiss Application No. 00805/15, filed Jun. 5, 2015. International Application Serial No. PCT/EP2016/062040 is hereby incorporated herein in its entirety for all purposes by this reference.

FIELD OF THE INVENTION

The invention relates to a component transducer based on piezoelectric crystal material for sensing a torque component. The invention also relates to a multi-component transducer for sensing more than one component of forces and torques using such component transducer. In addition, the invention relates to a use of such multi-component transducer.

BACKGROUND

Pressure or force transducers are used in a wide variety of applications. Such transducers are often exposed to various forces and torques. Examples are measurements of cutting forces in manufacturing processes, particularly in milling, planing and the like, where a translational movement is performed under force. Depending on the application, a plurality of components of forces and torques in a Cartesian coordinate system with three coordinate axes X, Y, and Z are sensed simultaneously.

Known pressure or force transducers work on the basis of piezoelectric crystal material or strain gauges (DMS). In the case of the piezoelectric crystal material, the sensor element and transducer element are combined in one part while the DMS is only a sensor element and must be connected to a separate transducer element to form a DMS system. There are big differences between the two with respect to function. Thus, the rigidity and, therefore, accuracy, natural frequency, overload capability of the piezoelectric crystal material typically are by an order of magnitude higher than in the case of the DMS system. In addition, the dimensions of a transducer comprising piezoelectric crystal material are smaller by a factor of 30 than a comparable transducer that comprises a DMS system. And finally, the dynamic measuring range of the piezoelectric crystal material is much broader so that a single transducer comprising piezoelectric crystal material covers the dynamic measuring range of multiple transducers comprising DMS systems. For these reasons, the invention relates to a multi-component transducer based on piezoelectric crystal material.

The document CH472668A corresponding to U.S. Pat. No. 3,566,163 discloses a three-component transducer based on piezoelectric crystal material for the simultaneous measurement of three force components. The structural design of this three-component transducer is schematically shown in detail in FIG. 1 of the present specification. A force F indicated by a straight arrow is absorbed by disc-shaped elements 21 made of piezoelectric crystal material. The negative electric polarization charges generated by the force F on element surfaces of the elements 21 are indicated by minus signs − while the positive electric polarization charges generated by the force F on element surfaces of the elements 21 are indicated by plus signs +. The component transducer 20 comprises sensing electrodes 22 for receiving the positive electric polarization charges and it comprises electrodes 23 for receiving the negative electric polarization charges. The sensing electrode 22 provides an output signal that is proportional to the amount of the absorbed force component. The electrode 23 is grounded. Three component transducers 20, each with two elements 21, are stacked on top of each other along the Z coordinate axis forming a group 200 for directly and simultaneously receiving three force components Fx, Fy and Fz. The uppermost transducer 20 measures the force component Fx. The lowermost transducer 20 measures the force component Fy. The intermediate transducer 20 measures the force component Fz.

However, in automation technology and especially in robotics in the case of humanoid robots or as a wrist sensor there is a long-kept need for the acquisition of forces and torques in all three Cartesian coordinates.

To address this, the document CH502590A discloses a six-component transducer for detecting a plurality of components of forces and torques. Four identical three-component transducers based on piezoelectric crystal material are arranged in an X-Y plane spaced apart from each other in the form of a rectangle. The constructional design of each of the four three-component transducers is as known from document CH472668A corresponding to U.S. Pat. No. 3,566,163. The lengths of the sides of the rectangle are many times longer than the diameters of each of the three-component transducers. Thus, each of the three-component transducers simultaneously and directly senses three force components and, subsequently, three further torque components are calculated from the sensed force components and the distances of the three-component transducers from each other by means of vector calculation.

A first object of the present invention is to provide a component transducer based on piezoelectric crystal material for sensing a torque component. Another object of the invention is to provide a multi-component transducer for sensing multiple components of forces and torques using such component transducer wherein said multi-component transducer has as small overall dimensions as possible. Furthermore, the component transducer as well as the multi-component transducer shall be robust in construction and cost-effective in manufacture.

BRIEF SUMMARY OF THE INVENTION

At least one of these objects is achieved by the features described below.

The invention relates to a component transducer for sensing a torque component. The component transducer comprises an element made of piezoelectric crystal material that defines element surfaces on which a force component generates electric polarization charges. The torque component to be sensed has at least one pair of force that have the same axis of action and opposite directions of action. The component transducer senses the force components of one pair separately from the force components of any other pair that share an axis of action and opposite directions of action.

Surprisingly, it has been found that a torque component can be sensed directly by means of an element made of piezoelectric crystal material if the force components of a pair are sensed separately. For this purpose, the element may consist of multiple element segments so that each element segment senses one of the force components of the pair. The element segments are spaced apart from each other by a gap. On the other hand, a sensing electrode for receiving the electric polarization charges may consist of a plurality of sensing electrode segments so that each sensing electrode segment receives electric polarization charges from one of the force components of the pair. The sensing electrode segments are also spaced apart from each other.

In a first preferred embodiment, element segments with opposite direction of polarization are arranged side by side to each other to opposite directions of action of one pair of force components of the torque component so that each element segment receives one of the force components of the pair. In further preferred embodiments, sensing electrode segments are arranged on different element faces of an element while the element is arranged with its direction of polarization to opposite directions of action of a pair of force components of the torque component so that the force components of the pair generate electric polarization charges on element surfaces and so that each sensing electrode segment receives electric polarization charges from one of the force components of the pair.

The component transducer requires relatively small structural dimensions, is built in a robust manner and can be manufactured at low cost.

The invention also relates to a multi-component transducer using a transducer such component transducer as well as to a use of such multi-component transducer.

BRIEF DESCRIPTION OF THE DRAWINGS

In the following, the invention will be illustrated in more detail with respect to the figures in which

FIG. 4 shows a schematic view of a portion of a first embodiment of a component transducer according to the invention for the shear effect sensing a torque component;

FIG. 5 shows a schematic view of a portion of a second embodiment of a component transducer according to the invention for the shear effect sensing a torque component;

FIG. 6 shows a schematic view of a portion of a third embodiment of a component transducer according to the invention for the shear effect sensing a torque component;

FIG. 7 shows a schematic view of a portion of a fourth embodiment of a component transducer according to the invention for the shear effect sensing a torque component;

DESCRIPTION OF EXEMPLARY EMBODIMENTS OF THE INVENTION

The direct piezoelectric effect is the production of electric polarization charges which are proportional to the amount of the force F acting onto the piezoelectric crystal material. Piezoelectric crystal material such as quartz ($SiO_2$ single crystal), calcium gallo-germanate ($Ca_3Ga_2Ge_4O_{14}$ or CGG), langasite ($La_3Ga_5SiO_{14}$ or LGS), tourmaline, gallium orthophosphate, etc., is described in the book "Piezoelectric Sensors" by G. Gautschi, published by Springer Verlag. The piezoelectric crystal material is cut into elements with element surfaces in crystallographic orientations such that it has a high sensitivity for the force F to be sensed, i.e. a high number of negative and positive electric polarization charges are generated on the element surfaces. With respect to the Cartesian coordinate system of the force F to be sensed, the coordinate axis of the high sensitivity is referred to as the direction of polarization P. In FIGS. 1 through 11, the direction of polarization P extends from the element surface with negative electric polarization charges towards the element surface with positive electric polarization charges.

The force F includes force components Fx, Fy, Fz wherein the indices indicate the element surfaces x, y, z onto which the force components Fx, Fy, Fz act. The force F acts onto the element surfaces either as a normal force or as a shear force. A normal force acts along an axis of action that is parallel to the surface normal of the element surface. A shear force acts along an axis of action that is perpendicular to the surface normal of the element surface. Regarding the direct piezoelectric effect this means that a longitudinal effect is distinguished from a shear effect. The longitudinal effect produces electric polarization charges on element surfaces whose surface normal is parallel to the axis of action of the normal force. The shear effect produces electric polarization charges on element surfaces whose surface normal is perpendicular to the axis of action of the shear force. Thus, the piezoelectric crystal material is cut into elements with element surfaces in crystallographic orientations such that the direction of polarization P of the latter is either parallel to the axis of action of a normal force or the direction of polarization P is perpendicular to the axis of action of a shear force.

Figure 1:
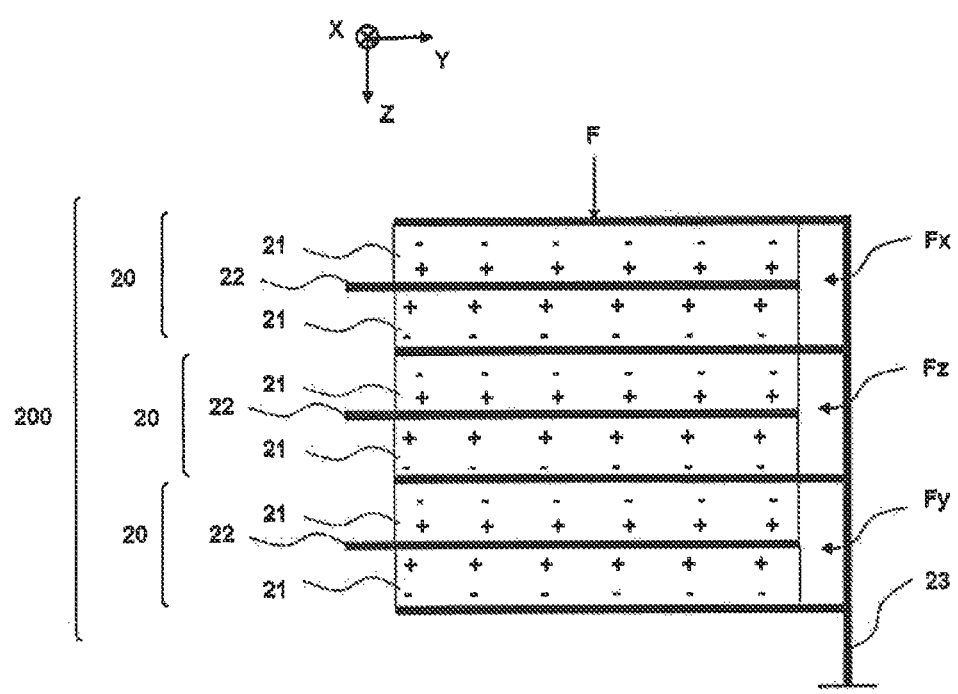
FIG. 1 shows a schematic view of the constructional design of a three-component transducer of the prior art.

FIG. 1 exemplarily shows the sensing of force components Fx, Fy and Fz by the three-component transducer known from the document CH472668A corresponding to U.S. Pat. No. 3,566,163. The three-component transducer comprises a plurality of elements 21 comprising element surfaces. Each element 21 has a direction of polarization P that is parallel to the Z coordinate axis. The sensing electrode 22 and the electrode 23 are arranged in the X-Y plane of the shear force and perpendicular to the normal force. A first component transducer 20 senses the shear effect of the X axis of action of a shear force. A second component transducer 20 senses the longitudinal effect of the Z axis of action of a normal force. A third component transducer 20 senses the shear effect of the Y axis of action of a shear force.

A torque component Mx, My, Mz consists of at least one pair having force components. The force components of a pair are parallel to each other (with the same axis of action) and have opposite directions of action. The indices x, y, z indicate the axis of action of the torque components Mx: My, Mz, respectively. The torque component Mz having the z axis as its axis of action comprises two pairs of force components +Fx, −Fx and +Fy, −Fy, each pair, whether +Fx, −Fx or +Fy, −Fy, acting about the z axis. The torque component Mx comprises one pair having force components +Fz, −Fz acting about the x axis. The torque component My also comprises one pair having force components +Fz, −Fz acting about the y axis.

Figure 2:
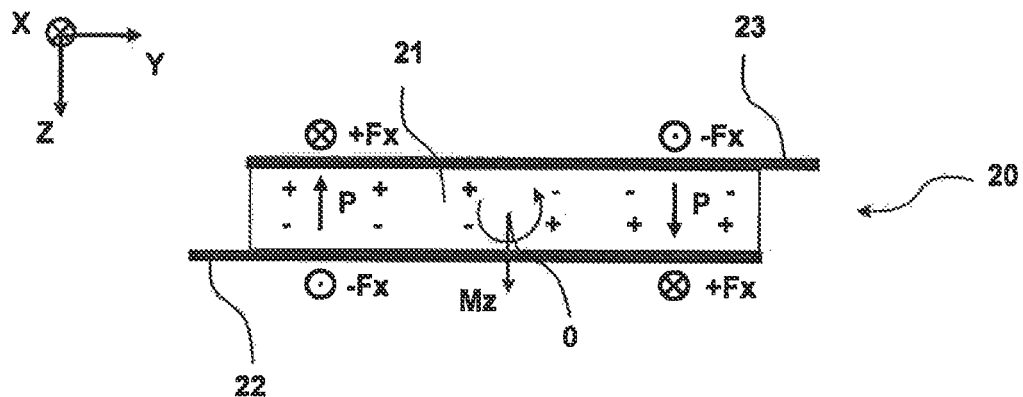
FIG. 2 shows a schematic view of a portion of a known component transducer for the shear effect according to FIG. 1 sensing a torque component.
Figure 3:
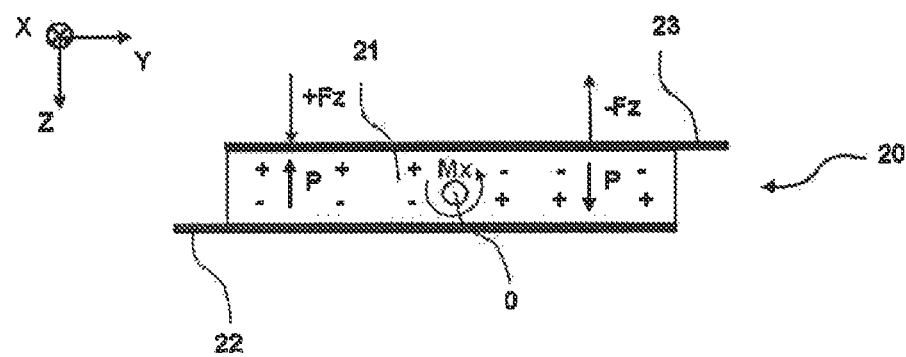
FIG. 3 shows a schematic view of a portion of a known component transducer for the longitudinal effect according to FIG. 1 sensing a torque component.

The known three-component transducer according to FIG. 1 is unable to sense a torque component. This is demonstrated in FIGS. 2 and 3. For this purpose, FIG. 2 shows a portion of the first component transducer 20 for the shear effect of the X axis of action of a shear force according to FIG. 1. The torque component Mz to be sensed in FIG. 2 comprises a pair of shear force components +Fx, −Fx and it comprises a pair of shear force components +Fy, −Fy. However, the first component transducer 20 only senses the pair of shear force components +Fx and −Fx of the torque component Mz that acts along the X coordinate axis. FIG. 3 shows a portion of the second component transducer 20 for the longitudinal effect of the Z axis of action of a normal force according to FIG. 1. The torque component Mx to be sensed in FIG. 3 comprises only one pair of normal force components +Fz, −Fz. However, the second component transducer 20 only senses the pair of normal force components +Fz and −Fz of the torque component Mx that acts along the Z coordinate axis. Due to the opposite directions of action of the two force components +Fx and −Fx according to FIG. 2 and +Fz and −Fz according to FIG. 3, both negative electric polarization charges and positive electric polarization charges are generated on the element surface of the sensing electrode 22. A sum of the electric polarization charges received by the sensing electrode 22 is zero, i.e. the component transducer 20 is unable to detect the torque components Mz and Mx.

Figure 8:
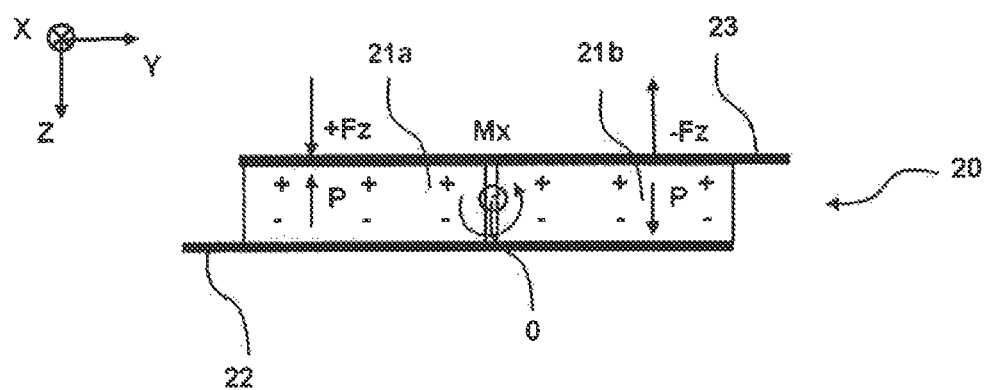
FIG. 8 shows a schematic view of a portion of a first embodiment of a component transducer according to the invention for the longitudinal effect sensing a torque component.
Figure 9:
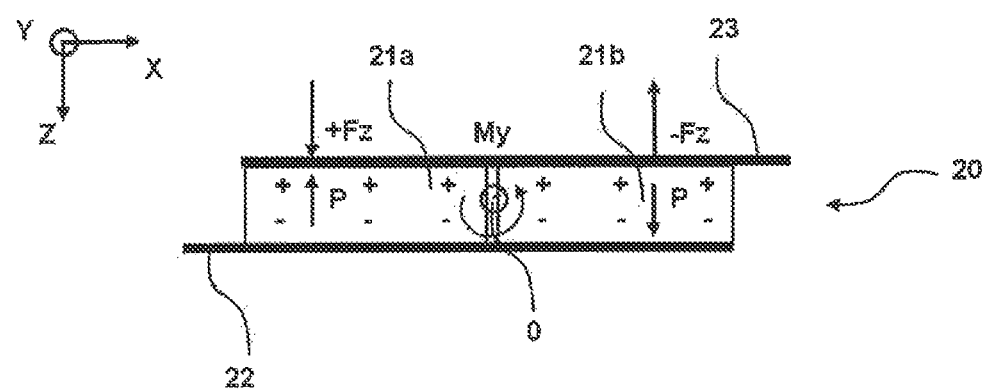
FIG. 9 shows a schematic view of a portion of a second embodiment of a component transducer according to the invention for the longitudinal effect sensing a torque component.
Figure 10:
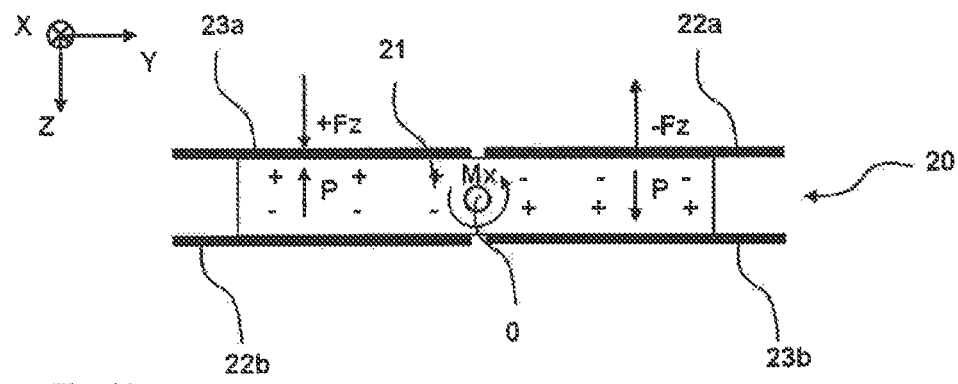
FIG. 10 shows a schematic view of a portion of a third embodiment of a component transducer according to the invention for the longitudinal effect sensing a torque component.
Figure 11:
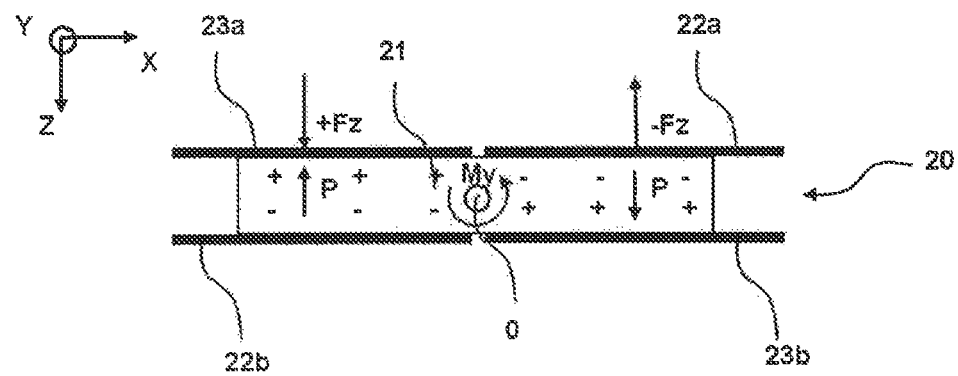
FIG. 11 shows a schematic view of a portion of a fourth embodiment of a component transducer according to the invention for the longitudinal effect sensing a torque component.

FIGS. 4 to 7 show portions of four embodiments of a component transducer 20 according to the invention for the shear effect when sensing a torque component Mz comprising a pair of shear force components +Fx, −Fx and a pair of shear force components +Fy, −Fy. FIGS. 8 and 10 show portions of two embodiments of a component transducer 20 of the invention for the longitudinal effect when sensing a torque component Mx comprising a pair of normal force components +Fz, −Fz. FIGS. 9 and 11 show portions of two embodiments of a component transducer 20 according to the invention for the longitudinal effect when sensing a torque component My comprising a pair of normal force components +Fz, −Fz. For a better comparability to the component transducers 20 of the prior art according to FIGS. 2 (shear effect) and 3 (longitudinal effect) the Figures are drawn similarly and the same reference numerals are used. Therefore, reference is made to the description of FIGS. 1 to 3 and in the following, mainly the differences will be described.

In the embodiments according to FIGS. 4, 5, 8 and 9, the element 21 made of piezoelectric crystal material consists of multiple element segments 21a, 21b. Element segments 21a, 21b are identical halves of a disc-shaped or ring-shaped element 21 of piezoelectric crystal material according to FIGS. 1 to 3 cut in half in the X-Z plane. Thus, element segments 21a, 21b are semicircles delimited by opposing surfaces. The opposing surfaces are parallel to the X-Z plane or to the Y-Z plane, respectively, and accordingly in FIGS. 4, 5, 8 and 9 a gap is shown between the opposing surfaces. The element segments 21a, 21b are spaced apart from each other by the gap. The two element segments 21a, 21b are arranged side by side in the X-Y plane between the sensing electrode 22 and the electrode 23. The sensing electrode 22 is arranged on one face of the element that is lower with respect to the element center 0. According to FIGS. 4, 5, 8 and 9, the sensing electrode 22 receives electric polarization charges from the two element segment surfaces of the element segments 21a, 21b that are lower with respect to the element center 0 and provides the output signal. The polarization direction P of the two element segments 21a, 21b runs parallel to the Z coordinate axis, however, their directions of polarization P are opposite. The element segments 21a, 21b are arranged in an orientation with opposite directions of polarization P to opposite directions of action of force components +Fx, −Fx, +Fy, −Fy, +Fz, −Fz of each pair so that the first element segment 21a senses the first force component +Fx according to FIG. 4, +Fy according to FIG. 5, and +Fz according to FIGS. 8 and 9 of the pair and so that the second element segment 21b senses the second force component −Fx according to FIG. 4, −Fy according to FIG. 5, and −Fz according to FIGS. 8 and 9 of the pair. The received force components generate negative electric polarization charges on the element surface of the sensing electrode 22. The sensing electrode 22 that is arranged on one face at the element surfaces of the two element segments 21a, 21b receives these negative electric polarization charges. Thus, the sum of the electric polarization charges received by the sensing electrode 22 is proportional to the amount of the torque component Mz according to FIGS. 4 and 5 or proportional to the amount of the torque component Mx according to FIG. 8 or proportional to the amount of the torque component My according to FIG. 9, respectively, i.e. the component transducer 20 detects torque component Mz or Mx or My, respectively.

The skilled person knowing the present invention can also use element segments of a different shape in the component transducer and/or use a greater number of element segments in the component transducer. Thus, those skilled in the art can use rectangular element segments instead of disc-shaped element segments. In addition, the skilled artisan can use four or six or more element segments. Even in the case of using more than two element segments, the element segments will be arranged side by side with different polarity in the plane of action on each element face. Thus, four element segments can be arranged on one element face so that all four element segments are identical in size and an equal number of element surfaces are positively polarized and an equal number of element surfaces are negatively polarized on each element face.

In the embodiments according to FIGS. 6, 7, 10 and 11, the sensing electrode 22 consists of multiple sensing electrode segments 22a, 22b. Sensing electrode segments 22a, 22b are identical halves of a disc-shaped or ring-shaped sensing electrode 22 according to FIGS. 1 to 3 cut in half in the X-Z plane. Sensing electrode segments 22a, 22b are arranged in the X-Y plane. Sensing electrode segments 22a, 22b are arranged on both faces, i.e. above and below the two surfaces of the element 21 with regard to the element center 0. Sensing electrode segments 22a, 22b are spaced apart from each other by the element 21. According to FIGS. 6, 7, 10 and 11 a first sensing electrode segment 22a receives negatively charged electric polarization charges from an element surface that is the upper one with respect to the element center 0, and a second sensing electrode segment 22b receives negatively charged electric polarization charges from an element surface that is the lower one with respect to the element center 0. Element 21 is arranged with its direction of polarization P to opposite directions of action of the force components +Fx, −Fx; +Fy, −Fy; +Fz, −Fz of each pair so that the first sensing electrode segment 22a receives electric polarization charges generated by the first force component +Fx, +Fy, +Fz of the pair and the second sensing electrode segment 22b of the 20 receives electric polarization charges generated by the second force component −Fx, −Fy, −Fz of the pair. These received electric polarization charges are the output signal.

Similar to the sensing electrode, the grounded electrode consists of multiple electrode segments 23a, 23b. Electrode segments 23a, 23b are identical halves of a disc-shaped electrode 23 according to FIGS. 1 to 3 cut in half in the X-Z plane. Sensing electrode segments 22a, 22b are arranged in the X-Y plane on opposite element surfaces. Electrode segments 23a, 23b are arranged on both faces, i.e. above and below element surfaces with regard to the element center 0. According to FIGS. 6, 7, 10 and 11, a first electrode segment 23a receives positively charged electric polarization charges from the element surface that is the upper one with regard to the element center 0, and a second electrode segment 23b receives positively charged electric polarization charges from the element surface that is the lower one with regard to the element center 0. The first and second electrode segments 23a, 23b are grounded. The sum of the electric polarization charges received by the sensing electrode segments 22a, 22b is proportional to the amount of the torque component Mz according to FIGS. 6 and 7 or proportional to the amount of the torque component Mx according to FIG. 10 or proportional to the amount of the torque component My according to FIG. 11, respectively, i.e. the component transducer 20 detects torque component Mz or Mx or My, respectively.

Also in this embodiment, the skilled person aware of the present invention can use sensing electrode segments or electrode segments, respectively, of a different shape in the component transducer and/or can use a greater number of sensing electrode segments or electrode segments, respectively, in the component transducer. Thus, instead of using disc-shaped or ring-shaped sensing electrode segments or electrode segments, respectively, those skilled in the art can use rectangular sensing electrode segments or electrode segments, respectively. Furthermore, those skilled in the art can use four or six and more sensing electrode segments or electrode segments, respectively. And in cases where more than two sensing electrode segments or electrode segments, respectively, are used, the sensing electrode segments or electrode segments, respectively, are arranged in the plane of action above and below element surfaces with regard to the element center. Four sensing electrode segments or four electrode segments, respectively, per element surface can be arranged so that all four sensing electrode segments or all four electrode segments, respectively, are identical in size and an equal number of sensing electrode segments or electrode segments, respectively, are arranged at each element surface. Finally, the skilled artisan knows how to carry out the receiving of electric polarization charges in a different way. While according to the invention the sensing electrode receives positive electric polarization charges and, thus, supplies an output signal, the skilled person can also provide a sensing electrode that captures negative electric polarization charges.

Figure 12:
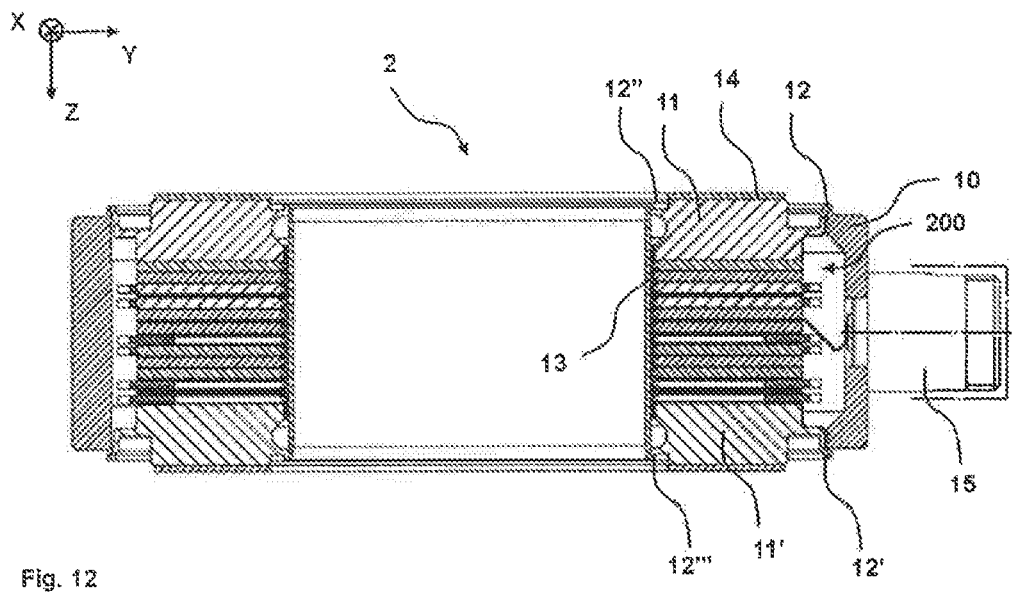
FIG. 12 represents a cross-section of the constructional design of an embodiment of a multi-component transducer of the invention using component transducers according to FIGS. 4, 5, 8 and 9.
Figure 13:
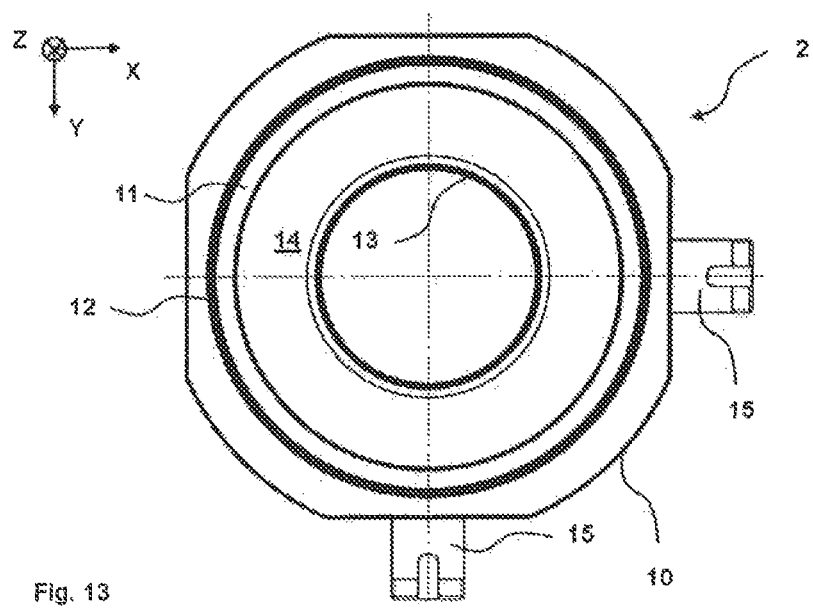
FIG. 13 shows a view of the multi-component transducer according to FIG. 12.

FIG. 12 shows a cross-section of a constructional design of a preferred embodiment of a multi-component transducer 1 of the invention. Multi-component transducer 2 has a housing 10 consisting of a circular or angular plate having a central through hole in the direction of a Z coordinate axis. Upper and lower delimitations of the housing 10 extend parallel to each other in an X-Y plane. Housing 10 protects the multi-component transducer 2 from shocks and impacts that may occur during use. Housing 10 also protects the multi-component transducer 2 from harmful environmental influences such as contamination (dust, moisture, etc.). Finally, housing 10 protects the multi-component transducer 2 from electric and electromagnetic interferences in the form of electromagnetic radiation.

A group 200 of component transducers is arranged in the through hole between two force transmission plates 11, 11' as seen from the direction of the Z coordinate axis. Force transmission plates 11, 11' and group 200 are hollow cylinders having an outer radius and inner radius. Both the outer radius and the inner radius are larger than a mantle height of the hollow cylinders. For example, for the force transmission plates 11, 11' and for the group 200 the outer radius will be 25 mm and the inner radius will be 15 mm. For example, for the force transmission plates 11, 11' the mantle height will be 5 mm and for the group 200 the mantle height will be 10 mm.

Force transmission plates 11, 11' receive the forces and torques to be sensed and transmit them to the group 200. For this purpose, force transmission plates 11, 11' are elastically connected at their outer radius to the housing 10 in the direction of the Z coordinate axis under pretension via first flanges 12, 12'. The force transmission plates 11, 11' and flanges 12, 12' are formed from a single piece. The connection of the flanges 12, 12' to the delimitations of the housing 10 is achieved by material bonding. At their inner radius, the two force transmission plates 11, 11' are connected under pretension to an inner sleeve 13 via further flanges 12", 12'" by means of material bonding. The inner sleeve 13 is cylindrical about an axis that extends in the direction of the Z coordinate axis. Thus, the two force transmission plates 11, 11' are pretensioned against group 200 with a defined first mechanical pretension via flanges 12, 12', 12", 12'". In this way, group 200 is subjected to a first pretension. The first mechanical pretension ensures a very good electrical contact to the sensing electrodes, sensing electrode segments, electrodes and electrode segments. The wall thickness of the inner sleeve 13 is less than or equal to 0.1 mm. The amount of the first mechanical pretension is in the range of several kN. Welding, soldering and bonding can be used for material bonding.

The housing 10, force transmission plates 11, 11', and inner sleeve 13 are made of mechanically robust material such as stainless steel, steel alloys, etc. The housing 10, force transmission plates 11, 11', and inner sleeve 13 achieve gas-tight sealing of the multi-component transducer 2. A cover plate 14 made of material with a high coefficient of friction such as ceramic, steel, etc. is attached on the outside of surfaces of the force transmission plates 11, 11'. The cover plate 14 is attached by material bonding, for example by bonding, soldering, etc. Due to its high coefficient of friction the cover plate 14 achieves a substantially loss-free transmission of the forces and torques to be sensed onto the force transmission plates 11, 11'.

Group 200 comprises a plurality of component transducers 20. Each component transducer 20 comprises elements 21 or element segments 21a, 21b, a sensing electrode 22 and an electrode 23. For the description of the elements 21 and element segments 21a, 21b as well as the sensing electrode 22 and electrode 23 reference is made to the description of FIGS. 1 to 11. The elements 21, element segments 21a, 21b, sensing electrode 22 and electrode 23 have substantially identical inner radius, substantially identical outer radius and are arranged parallel to each other in the X-Y plane.

Figure 14:
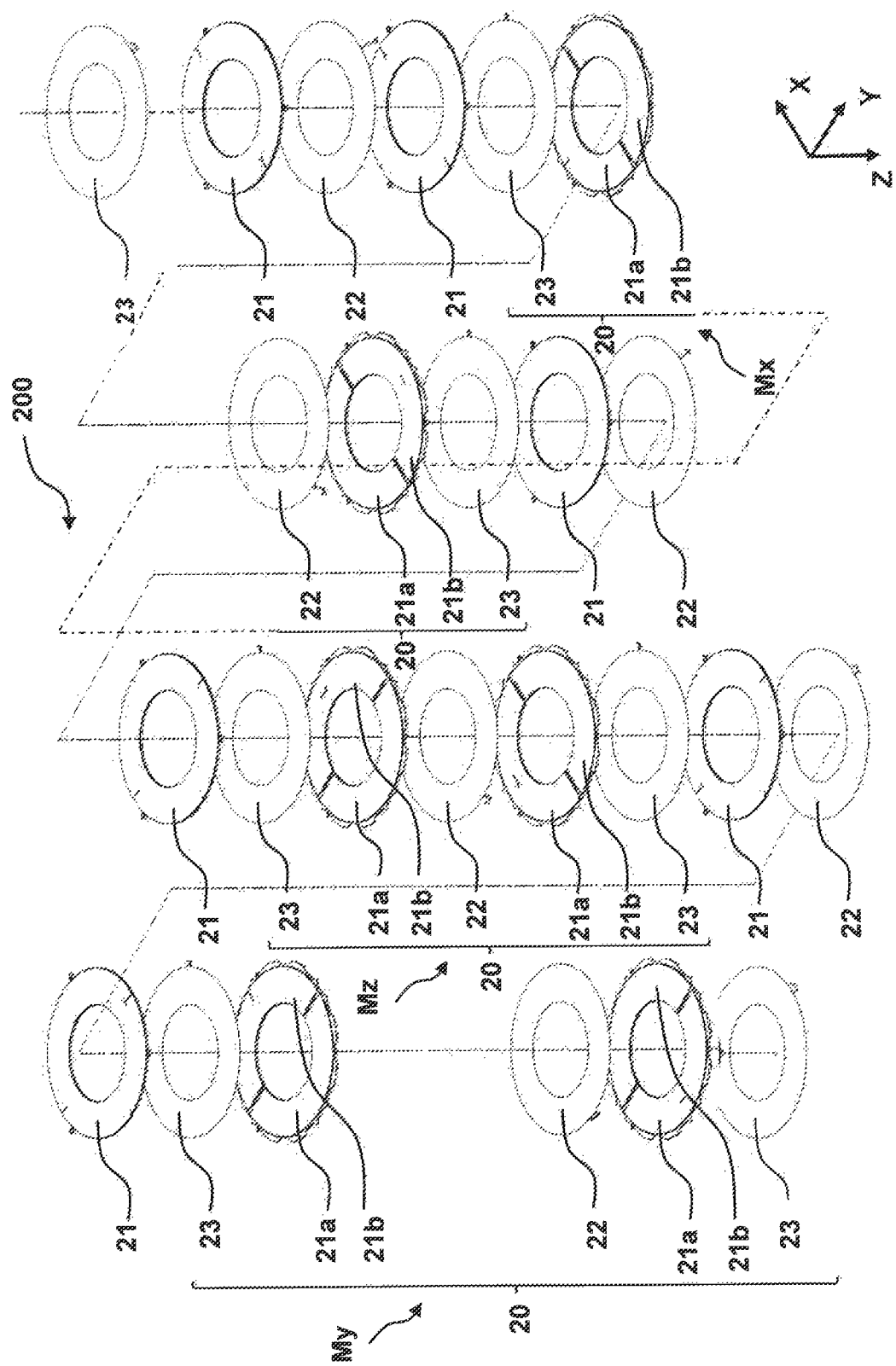
FIG. 14 shows a exploded view of the constructional design of the multi-component transducer according to FIG. 12.

The exploded view according to FIG. 14 shows six component transducers 20 of the group 200 arranged stacked on top of each other in the direction of the Z coordinate axis. The multi-component transducer 2 directly receives a force component Fx, Fy, Fz, respectively, via three component transducers 20, and the component transducer 20 directly receives a torque component Mx, My, Mz, respectively, via three component transducers 20. The output signals of the component transducers 20 can be transmitted via terminals 15 to an evaluation unit (not shown).

The component transducers 20 for the force components Fx, Fy, Fz use disc-shaped elements 21 having a direction of polarization P that is parallel to the Z coordinate axis. Two elements 21 that are arranged in one layer are electrically connected in parallel to form a pair of elements. Thus, each component transducer 20 for the force components Fx, Fy, Fz comprises a pair of elements in each of two layers of elements 21, a sensing electrode 22 and two electrodes 23. The sensing electrode 22 is positioned between the two layers of elements 21. The sensing electrode 22 is positioned between equally polarized element surfaces of the pair of elements and provides an output signal. On the outside of each of the two layers of elements 21 is disposed an electrode 23 that is grounded. A first component transducer 20 captures the shear effect of the X axis of action of a shear force. A second component transducer 20 captures the shear effect of the Y axis of action of a shear force. A third component transducer 20 captures the longitudinal effect of the Z axis of action of a normal force.

The component transducers 20 for the torque components Mx, My, Mz use disc. shaped element segments 21a, 21b having a direction of polarization P that is parallel to the Z coordinate axis. The element segments 21a, 21b are semicircles delimited by abutting surfaces. The abutting surfaces extend parallel to the X-Z plane and are separated from each other by a gap. As schematically shown in the leftmost column of FIG. 14, two element segments 21a, 21b each are arranged with opposite direction of polarity P side by side to define a first layer in the X-Y plane between the sensing electrode 22 and the electrode 23 at the bottom of this leftmost column. A second layer of element segments 21a, 21b is electrically connected in parallel to the pair of element segments 21a, 21b in the first layer. Each component transducer 20 for the respective one the torque components Mx, My, Mz comprises a pair of element segments 21a, 21b in each of the two layers of element segments 21a, 21b, a sensing electrode 22 and two electrodes 23. The sensing electrode 22 is positioned between the two layers of element segments 21a, 21b. The sensing electrode 22 is positioned between element surfaces of the two paired layers of element segments 21a, 21b and provides an output signal. One electrode 23 each is positioned on the outside at each opposite end of the two paired layers of element segments 21a, 21b and is grounded.

A fourth component transducer 20 captures the longitudinal effect of the pair of force components +Fz and −Fz of the torque component Mx. The gap between opposing surfaces of two element segments 21a, 21b of the fourth component transducer 20 is arranged in both layers in an orientation parallel to the X axis of action of the torque component Mx. A fifth component transducer 20 senses the longitudinal effect of the pair of force components +Fz and −Fz of the torque component My. The gap between opposing surfaces of two element segments 21a, 21b of the fifth component transducer 20 is arranged in both layers in an orientation parallel to the Y axis of action of the torque component My. A sixth component transducer 20 senses the shear effect of the first pair of force components +Fx and −Fx and the second pair of force components +Fy and Fy of the torque component Mz. In one layer, the gap between opposing surfaces of two element segments 21a, 21b of the sixth component transducer 20 is arranged in an orientation parallel to the X axis of action of the first pair of force components +Fx and −Fx. In another layer, the gap between opposing surfaces of two element segments 21a, 21b of the sixth component transducer 20 is arranged in an orientation parallel to the Y direction of action of the second pair of force components +Fy and −Fy.

Typically, the sensitivity of the elements 21 and element segments 21a, 21b is in the range of 100 pC/Nm to 1000 pC/Nm.

The sensing electrodes 22 and electrodes 23 may consist of metallizations of elements 21 and element segments 21a, 21b made of piezoelectric crystal material or they may consist of separate metal films. The metallizations or the metal films, respectively, consist of electrically conductive metal such as steel, copper, copper alloys, etc. A mantle height of the elements 21 and disc segments 21a, 21b is approximately 0.8 mm, a mantle height of the sensing electrodes 22 and electrodes 23 is 0.1 mm.

Figure 15:
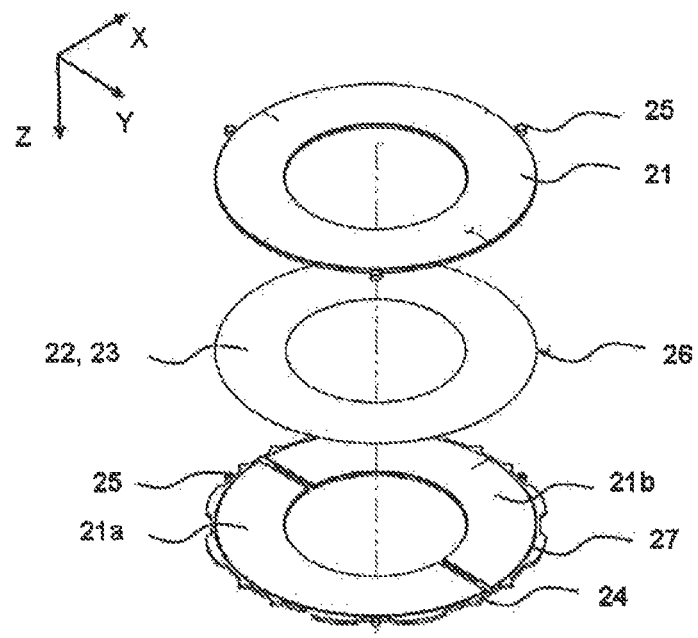
FIG. 15 shows a perspective representation of constituent parts of the multi-component transducer according to FIG. 12.

FIG. 15 shows a more detailed view of constituent parts of the multi-component transducer 2 with respect to the element 21, element segments 21a, 21b, sensing electrode 22 and electrode 23.

Each element segment 21a. 21b comprises an annular element 24. The annular element 24 having a certain width is attached on the outside of a mantle surface of the element segments 21a, 21b. The annular element 24 is attached to the mantle surface through a form-locking connection, for example. The annular element 24 is made from insulating material such as Teflon®, Kapton®, etc. A mantle height of the annular element 24 is 0.6 mm. A wall thickness of the annular element 24 is about 1.0 mm. A plurality of mounting brackets 27 are attached to the annular element 24. The brackets 27 are attached on the face of the annular element 24 that is opposite to the element segments 21a, 21b. The annular element 24 and the brackets 27 are made as a single piece. The mounting brackets 27 are radial protrusions of the annular element 24 and support the element segments 21a, 21b on the housing 10 in a mechanically centered and electrically insulated manner.

Three eyelets 25 are formed at an angle of 120° on the element 21 and on the two element segments 21a, 21b. The eyelets 25 are formed on the face of the annular element 24 that is opposite to the element 21 and the element segments 21a, 21b. The eyelets 25 are circular with a central opening in the X-Y plane. The eyelets 25 fasten the element 21 and element segments 21a, 21b to the housing mechanically or in a mechanically centered manner. For example, the eyelets 25 snap in corresponding recesses of the housing 10 in a force- and form-locking manner. The eyelets 25 snap in the recesses of the housing 10 in a resilient manner. When it snaps in, the circular eyelet 25 is deformed in the X-Y plane and additionally tensions the element 21 and the element segments 21a, 21b in the X-Y plane against the housing 10. The annular element 24 and the eyelets 25 are formed as a single piece.

Sensing electrode 22 and electrode 23 each comprise a contact 26. Contact 26 is mounted on the outside at a mantle surface of the sensing electrode 22 and electrode 23. Contact 26 is provided for electrically contacting the sensing electrode 22 with the terminal 15. Contact 26 is provided for electrically contacting the electrode 23 to earth. Contact 26 is formed as a single piece with the material of the sensing electrode 22 and electrode 23. The electric contact is achieved by material bonding such as welding, soldering, etc., to electrical conductors, for example.

Figure 16:
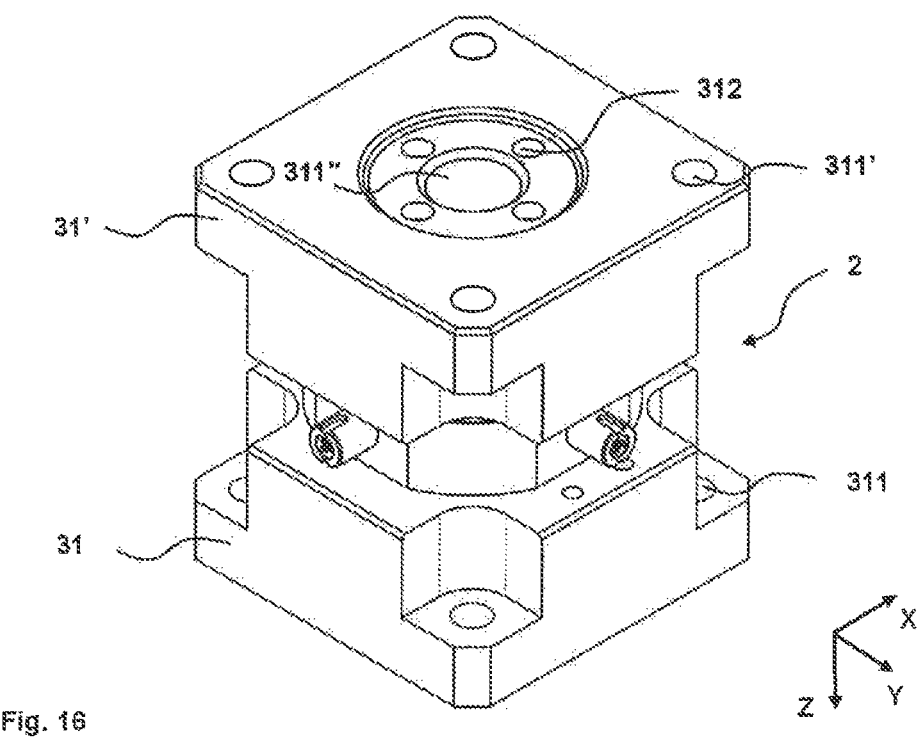
FIG. 16 shows a view of a use of the multi-component transducer according to FIGS. 12 to 14

FIG. 16 shows a use of the multi-component transducer 2 between two mounting plates 31, 31'. In the view shown in FIG. 12A, a first mounting plate 31 is arranged above multi-component transducer 2, while a second mounting plate 31 is arranged below multi-component transducer 2. Mounting plates 31, 31' are made of mechanically robust material such as stainless steel, steel alloys, etc. Mounting plates 31, 31' can be mechanically connected to a machine structure via mounting plate holes 311, 311', 311". Via four peripheral mounting plate holes 311, 311' or one central mounting plate hole 311" the multi-component transducer 2 can be connected to the machine structure with high flexural rigidity. Typical machine structures are tool tables of cutting machines, scales, vibration tables, humanoid robots, wrist transducers, etc.

Due to tensioner openings 312, the mounting plates 31, 31' can be tensioned with a defined second mechanical pretension against the housing 10 of the multi-component transducer 2. The second mechanical pretension is 140 kN, for example. The second mechanical pretension acts in the direction of the Z coordinate axis and tensions the force transmission plates 11, 11' against the group 200 via the housing 10. In this manner, group 200 is subjected to a second pretension. The second mechanical pretension of the group 200 enables large negative forces and torques to be sensed. The mechanical connection to the machine structure as well as the second mechanical pretension are achieved in a force- and form-locking manner by means of screws, rivets, etc. (not shown). Knowing the present invention, those skilled in the art can use the multi-component transducer with mounting plates that are smaller or larger in size. Furthermore, those skilled in the art can use the multi-component transducer without such mounting plate.

| List of reference numerals | |
|---|---|
| F | force |
| Fx, Fy, Fz | force component |
| Mx, My, Mz | torque component |
| X, Y, Z | coordinate axis |
| x, y, z | indices |
| 0 | element center |
| 1 | multi-component transducer |
| 10 | housing |
| 11, 11' | force transmission plate |
| 12, 12', 12", 12''' | flange |
| 13 | inner sleeve |
| 14 | cover plate |
| 15 | terminal |
| 15 | component transducer |
| 21 | element |
| 21a, 21b | first and second segment |
| 22 | sensing electrode |
| 22a, 22b | first and second sensing electrode segment |
| 23 | electrode |
| 23a, 23b | first and second electrode segment |
| 24 | annular element |
| 25 | eyelet |
| 26 | contact |
| 27 | mounting bracket |
| 31, 31' | first and second mounting plate |
| 200 | group |
| 311, 311', 311" | mounting plate opening |
| 312 | tensioner opening |

The invention claimed is:

1. A component transducer for sensing a torque component (Mx, My, Mz) that resolves from a force component (Fx, Fy, Fz), the component transducer comprising:
 a first element including a first segment and a second segment spaced apart from the first segment by a gap, each segment being formed of a first type of piezoelectric crystal material, each of the first and second segments defining a pair of opposing segment surfaces on which a force component (Fx, Fy, Fz) acting on the segment generates electric polarization charges;
 a first electrode contacting one of the pairs of opposing segment surfaces of each of the first and second segments;
 a second electrode contacting the other one of the pairs of opposing segment surfaces of each of the first and second segments; and
 wherein the first and second segments are disposed between the first and second electrodes so that the polarity of the first type of piezoelectric crystal material forming the first segment is opposite the polarity of the first type of piezoelectric crystal material forming the second segment;
 wherein the first segment is configured to sense a first force component (+Fx, +Fy, +Fz) and the second segment is configured to sense a second force component (−Fx, −Fy, −Fz);
 wherein the first type of piezoelectric crystal material is of the type that generates polarization charges when the force components (+Fx, −Fx; +Fy, −Fy; +Fz, −Fz) are normal force components (+Fz, −Fz);
 wherein each of the first and second segments of the first element is arranged in a plane perpendicular to the axis of action of said normal force components (+Fz, −Fz);
 wherein each of the first and second segments of the first element senses a longitudinal effect of normal force components (+Fz, −Fz);
 a second element spaced apart from the first element along the axis of action of said normal force components (+Fz, −Fz), the second element including a third segment and a fourth segment spaced apart from the third segment by a gap, each of the third and fourth segment being formed of a second type of piezoelectric crystal material, each of the third and fourth segments defining a pair of opposing segment surfaces on which a force component (Fx, Fy, Fz) acting on the segment generates electric polarization charges;
 wherein the second type of piezoelectric crystal material is of the type that generates polarization charges when the force components (+Fx, −Fx; +Fy, −Fy; +Fz, −Fz) are shear force components (+Fx, −Fx; +Fy, −Fy);
wherein each of the third and fourth segments is arranged in a plane of the axis of action of the shear force components (+Fx, −Fx; +Fy, −Fy); and
wherein each of the third and fourth segments senses a shear effect of shear force components (+Fx, −Fx; +Fy, −Fy).

2. The component transducer according to claim 1, wherein each of the element segments is disc-shaped or ring-shaped.

3. A component transducer for sensing a torque component (Mx, My, Mz) that resolves from a force component (Fx, Fy, Fz), the component transducer comprising:
 a first element formed of piezoelectric crystal material defining a pair of opposing element faces on which a force component (Fx, Fy, Fz) acting on the first element generates electric polarization charges;
 a first electrode contacting a first one of the pairs of opposing element faces of the first element;
 a second electrode contacting a second one of the pairs of opposing element faces of the first element;
 a third electrode spaced apart from the first electrode and contacting the first one of the pairs of opposing element faces of the first element;
 a fourth electrode spaced apart from the second electrode and contacting the second one of the pairs of opposing element faces of the first element; and
 wherein the polarity of the piezoelectric crystal material disposed between the first and second electrodes is opposite the polarity of the piezoelectric crystal material disposed between the third and fourth electrodes.

4. The component transducer according to claim 3, wherein the piezoelectric crystal material is of the type that generates polarization charges when the force components (+Fx, −Fx; +Fy, −Fy; +Fz, −Fz) are normal force components (+Fz, −Fz); wherein the first and third electrodes are arranged in a plane perpendicular to the axis of action of the normal force components (+Fz, −Fz); and wherein the first and third electrodes receive electric polarization charges of a longitudinal effect of normal force components (+Fz, −Fz).

5. The component transducer according to claim 3, wherein the piezoelectric crystal material is of the type that generates polarization charges when the force components (+Fx, −Fx; +Fy, −Fy; +Fz, −Fz) are shear force components (+Fx, −Fx; +Fy, −Fy); wherein the first and third electrodes are arranged in a plane of the axis of action of the shear force components (+Fx, −Fx; +Fy, −Fy); and wherein the first and third electrodes receive electric polarization charges of a shear effect of shear force components (+Fx, −Fx; +Fy, −Fy).

6. The component transducer according to claim 5, wherein each of the first and third electrodes is disc-shaped or ring-shaped.

7. A multi-component transducer for simultaneously sensing more than one component of forces and torques, comprising:
 a plurality of component transducers, each of the plurality of component transducers being stacked on top of or beneath each other of the plurality of component transducers to form a group,
  wherein each of the plurality of component transducers being configured for sensing a torque component (Mx, My, Mz),
  wherein each of the plurality of component transducers is configured for sensing a torque component (Mx, My, Mz) that resolves from a force component (Fx, Fy, Fz),
 wherein each of the plurality of component transducers includes:
  a housing including an upper force transmission plate and a lower force transmission plate, the plates being spaced apart from one another along a virtual Z-axis of action of normal force components (+Fz, −Fz);
  a first element including a first segment and a second segment spaced apart from the first segment by a gap, each segment being formed of piezoelectric crystal material defining a pair of opposing segment surfaces on which a force component (Fx, Fy, Fz) acting on the segment generates electric polarization charges;
  a first electrode contacting one of the pairs of opposing segment surfaces of each of the first and second segments;
  a second electrode contacting the other one of the pairs of opposing segment surfaces of each of the first and second segments;
  wherein each of the first element, first electrode and second electrode is held between the upper force transmission plate and the lower force transmission plate; and
  wherein the first and second segments are disposed between the first and second electrodes so that the polarity of the piezoelectric crystal material forming the first segment is opposite the polarity of the piezoelectric crystal material forming the second segment.

8. The multi-component transducer according to claim 7, wherein two layers comprising element segments each are electrically connected in parallel to a pair of element segments; wherein a sensing electrode is arranged between element surfaces of the pair of element segments; and said sensing electrode supplies an output signal.

9. The multi-component transducer according to claim 7, wherein each pair of element segments and each layer of two disc-shaped or ring-shaped element segments is spaced apart from each other by a gap; wherein for the pair for sensing the torque component (Mx) a gap between abutting surfaces of two element segments is arranged in both layers in an orientation parallel to the X axis of action of said torque component (Mx); wherein for the pair for sensing the torque component (My) a gap between abutting surfaces of two element segments is arranged in both layers in an orientation parallel to the Y axis of action of the torque component (My); and wherein for the pair for sensing the torque component (Mz) a gap between abutting surfaces of two element segments is arranged in one layer in an orientation parallel to the X axis of action of a first pair of force components (+Fx and −Fx) of the torque component (Mz) and in another layer parallel to the Y axis of action of a second pair of force components (+Fy and −Fy) of the torque component (Mz).

10. The multi-component transducer according to claim 7, wherein a component transducer for sensing a force component (Fx, −Fy, −Fz) comprises an element made of piezoelectric crystal material; said element comprising element surfaces, wherein said component (Fx, −Fy, −Fz) produces electric polarization charges on the element surfaces; the force component (Fx, Fy, Fz) either is a normal force component (Fz) or a shear force component (Fx, Fy); wherein said element is arranged in a plane perpendicular to the axis of action of the normal force component (Fz) or in a plane of the axis of action of the shear force component (Fx, Fy); and wherein said element senses a longitudinal effect of the normal force component (Fz), or said element senses a shear effect of the shear force component (Fx, Fy).

11. The multi-component transducer according to claim 10, further comprising an output connection; wherein two layers of elements each are electrically connected in parallel to form a pair; wherein a sensing electrode is arranged between element surfaces of the pair having the same polarization; and said sensing electrode is connected to the output connection and configured so that the sensing electrode supplies an output signal to the output connection.

12. The multi-component transducer according to claim 10, wherein each of three component transducers directly senses a force component (Fx, Fy, Fz); and each of three component transducers directly senses a torque component (Mx, My, Mz).

13. The multi-component transducer according to claim 10, further comprising a housing; wherein the element comprises an annular element; said annular element being attached on the outside of a mantle surface of an element segment; wherein said annular element comprises mounting brackets; and wherein said mounting brackets mechanically support said element segment on the housing of the multi-component transducer.

14. The multi-component transducer according to claim 10, further comprising a housing; wherein the element comprises an annular element; said annular element being attached on the outside of a mantle surface of the element; wherein said annular element comprises eyelets; and wherein said element is mechanically fastened or fastened in a mechanically centered manner to the housing of the multi-component transducer via the eyelets.

* * * * *